(12) United States Patent
Poole et al.

(10) Patent No.: US 9,160,677 B2
(45) Date of Patent: Oct. 13, 2015

(54) SEGMENTATION OF NETWORK PACKETS FOR A SWITCH FABRIC

(71) Applicant: Force10 Networks, Inc., San Jose, CA (US)

(72) Inventors: Glenn Poole, Fremont, CA (US); Brad Danofsky, Reno, NV (US); David Haddad, San Jose, CA (US); Ann Gui, Cupertino, CA (US); Heeloo Chung, San Francisco, CA (US); Joanna Lin, San Jose, CA (US)

(73) Assignee: Force10 Networks, Inc., San Jose, CA (US)

( * ) Notice: Subject to any disclaimer, the term of this patent is extended or adjusted under 35 U.S.C. 154(b) by 0 days.

(21) Appl. No.: 14/325,872

(22) Filed: Jul. 8, 2014

(65) Prior Publication Data

US 2014/0321281 A1    Oct. 30, 2014

Related U.S. Application Data

(63) Continuation of application No. 11/537,958, filed on Oct. 2, 2006, now Pat. No. 8,804,751.

(60) Provisional application No. 60/723,471, filed on Oct. 4, 2005, provisional application No. 60/724,094, filed on Oct. 6, 2005.

(51) Int. Cl.
*H04L 12/28* (2006.01)
*H04L 12/805* (2013.01)
*H04L 12/861* (2013.01)
*H04L 12/883* (2013.01)

(52) U.S. Cl.
CPC .............. *H04L 47/365* (2013.01); *H04L 49/90* (2013.01); *H04L 49/9021* (2013.01)

(58) Field of Classification Search
None
See application file for complete search history.

(56) References Cited

U.S. PATENT DOCUMENTS

| | | | |
|---|---|---|---|
| 5,796,776 A | 8/1998 | Lomp et al. | |
| 6,014,385 A | 1/2000 | Ayanoglu et al. | |
| 6,421,343 B1 | 7/2002 | Jun et al. | |
| 6,876,629 B2 | 4/2005 | Beshai et al. | |
| 6,888,824 B1 | 5/2005 | Fang et al. | |
| 6,888,848 B2 | 5/2005 | Beshai et al. | |
| 6,907,002 B2 | 6/2005 | Beshai et al. | |
| 6,975,638 B1 | 12/2005 | Chen et al. | |
| 7,042,883 B2 | 5/2006 | Fan et al. | |
| 7,079,845 B2 | 7/2006 | Shively et al. | |
| 7,082,127 B1 | 7/2006 | Hook | |
| 7,082,132 B1 * | 7/2006 | Beshai et al. | 370/391 |
| 7,154,902 B1 | 12/2006 | Sikdar | |
| 7,155,532 B2 | 12/2006 | Schoenblum | |
| 7,224,703 B2 * | 5/2007 | Antal et al. | 370/473 |
| 7,274,696 B1 | 9/2007 | Sikdar | |
| 7,277,425 B1 | 10/2007 | Sikdar | |
| 2003/0063562 A1 | 4/2003 | Sarkinen et al. | |
| 2003/0179532 A1 | 9/2003 | Goergen | |
| 2004/0059826 A1 | 3/2004 | Gould et al. | |
| 2004/0141494 A1 | 7/2004 | Beshai et al. | |
| 2004/0213291 A1 | 10/2004 | Beshai et al. | |
| 2005/0089054 A1 | 4/2005 | Ciancaglini et al. | |
| 2006/0146814 A1 | 7/2006 | Shah et al. | |
| 2007/0140230 A1 | 6/2007 | Beshai | |
| 2008/0069125 A1 | 3/2008 | Reed et al. | |
| 2008/0165688 A1 | 7/2008 | Beshai et al. | |

* cited by examiner

*Primary Examiner* — Jae Y Lee
*Assistant Examiner* — Aixa A Guadalupe-Cruz
(74) *Attorney, Agent, or Firm* — Haynes and Boone, LLP

(57) ABSTRACT

A network packet is segmented for transfer through a switch fabric. The last segment of the packet is allowed to exceed the maximum size of previous segments so as to increase the switch fabric utilization. Other features are also provided.

19 Claims, 6 Drawing Sheets

| SEGMENT SIZE = 480 MAX SEGMENT SIZE = 528 | SEGMENT | LENGTH | FSF | LSF |
|---|---|---|---|---|
| SMALL PACKET, SIZE = 256<br>P1 | P1.1 | 272 | 1 | 1 |
| MEDIUM PACKET, SIZE = 800<br>P2 | P2.1<br>P2.2 | 816<br>352 | 1<br>0 | 0<br>1 |
| MEDIUM PACKET, SIZE = 976<br>P3 | P3.1<br>P3.2 | 992<br>528 | 1<br>0 | 0<br>1 |
| LARGE PACKET, SIZE = 1200<br>P4 | P4.1<br>P4.2<br>P4.3 | 1216<br>480<br>288 | 1<br>0<br>0 | 0<br>0<br>1 |

NO SEGMENTATION: 6 PACKETS IN 3 EPOCHS

WITH SEGMENTATION: 7.5 PACKETS IN 3 EPOCHS

SEGMENTATION OF NETWORK PACKETS FOR A SWITCH FABRIC

CROSS REFERENCE TO RELATED APPLICATIONS

This patent application is a continuation of U.S. patent application Ser. No. 11/537,958, filed Oct. 2, 2006, incorporated herein by reference, which claims priority to U.S. Patent Application No. 60/723,471 filed Oct. 4, 2005, and U.S. Patent Application No. 60/724,094, filed Oct. 6, 2005, which are incorporated herein by reference.

FIELD OF THE INVENTION

The present disclosure relates generally to network processing devices, and more particularly to internal packet handling in such devices.

BACKGROUND

Packet network processing devices, such as switches and routers, generally receive data packets on multiple ingress ports, perform some sort of processing, and resend the data packets on appropriate ones of multiple egress ports. Packets can be received with a variety of packet lengths, from less than 100 bytes including the packet headers, to common Maximum Transmission Unit (MTU) packet sizes of about 1500 bytes, and any size in between. Some networks also allow "Jumbo" packets, for instance packets up to almost 10,000 bytes in length. Traffic patterns at a given port will generally contain a mix of packet lengths. Regardless of the traffic mix, the network processing device is expected to successfully switch/route its rated bandwidth, in bytes/second, through each of its ports.

BRIEF DESCRIPTION OF THE DRAWINGS

Aspects of the present disclosure are best understood from the following detailed description when read with the accompanying figures.

DETAILED DESCRIPTION

The following embodiments describe a network processing device having an epoch-switched internal switch fabric. An epoch is a length of time during which the switch fabric maintains a given input port-to-output port configuration, allowing packets to pass from selected switch fabric ingress ports to selected switch fabric egress ports. The switch fabric is reconfigured from epoch to epoch by a scheduler that prioritizes the flow of traffic through the device.

As used herein, segmentation refers to the splitting of a packet into two or more shorter length packet segments prior to some internal operation of the network processing device. After one or more internal operations are performed separately on the segments, but prior to the packet exiting the device, the segments are recombined.

Figure 1A:
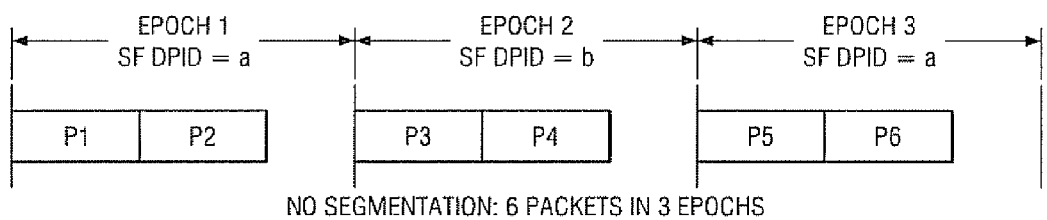
FIGS. 1A and 1B compares epoch-based packet transmission for non-segmented and internally segmented packets.
Figure 1B:
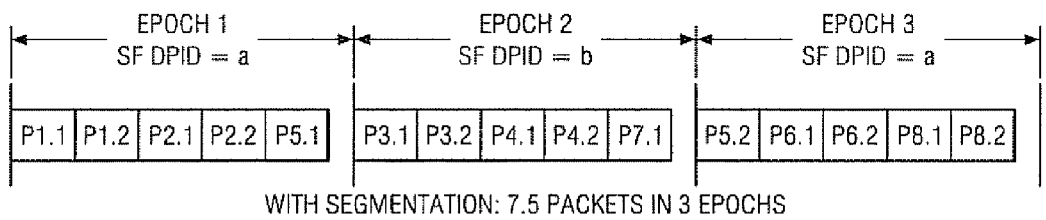

FIGS. 1A and 1B compare standard epoch behavior for an ingress unit over three consecutive epochs (FIG. 1A) with epoch behavior for the same unit operating according to a segmentation embodiment (FIG. 1B). During epochs 1 and 3, the ingress unit is passing packets through the switch fabric (SF) to an egress unit with a switch fabric destination port ID (DPID) a. In epoch 2, the ingress unit is passing packets through the switch fabric to an egress unit with an SF DPID b. In FIG. 1A, two packets (p1 and p2) are transmitted to DPID a during epoch 1, and the remainder of the epoch's bandwidth is wasted because another packet cannot fit in the remaining time. Two packets (p3 and p4) are transmitted to DPID b during epoch 2, with the same amount of wasted bandwidth. And two more packets (p5 and p6) are transmitted to DPID a again during epoch 3, with the same amount of wasted bandwidth.

In FIG. 1B, the packets are allowed to be segmented into segments that are one-half of the original packet length (for instance, segments p1.1 and p1.2 make up packet p1). The segments are independently transferable across the switch fabric. Accordingly, both segments of p1, both segments of p2, and one segment of p5 (segment p5.1) are transferred to DPID a during epoch a. The remainder of p5 (segment p5.2) is transferred to DPID a the next time that port is visited during epoch 3, along with both segments of p6 and two segments of another packet p8. In this example, 25% more switch fabric bandwidth is utilized due to the ability to transfer packet segments instead of requiring whole packets only within an epoch.

Figure 2:
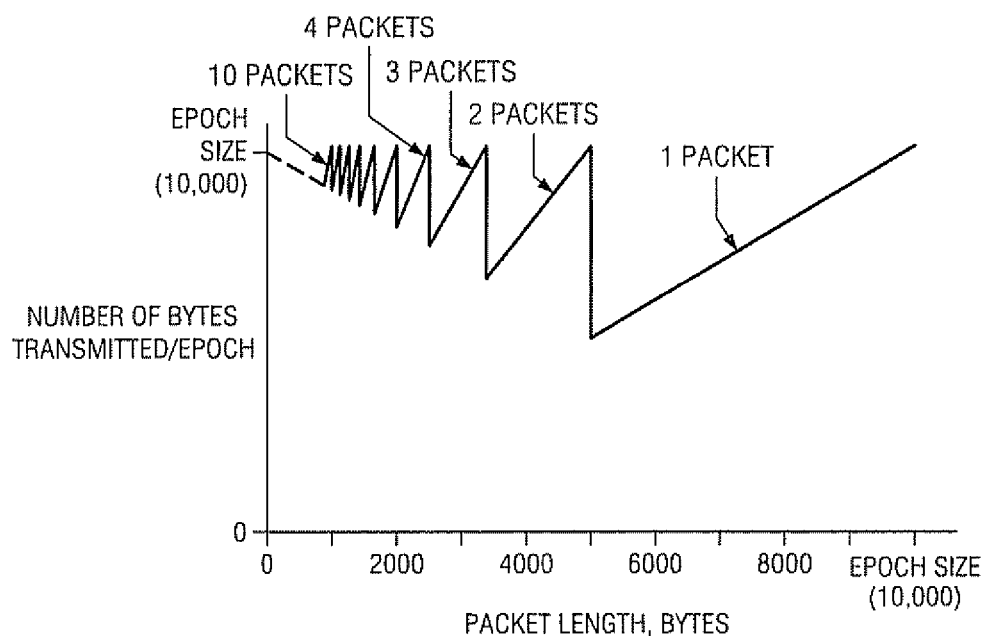
FIG. 2 contains a graph showing number of bytes transmitted per epoch as a function of packet length for non-segmented packets.
Figure 3:
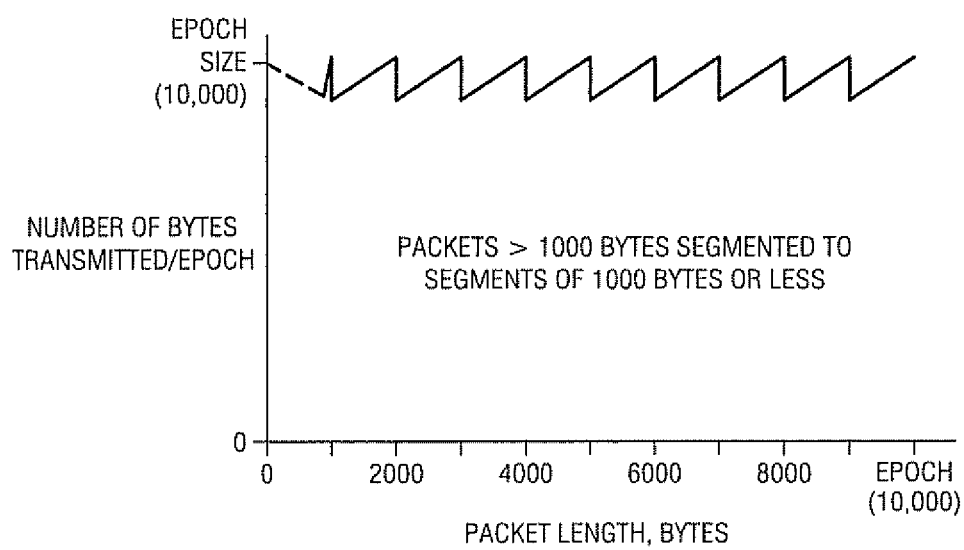
FIG. 3 contains a graph showing number of bytes transmitted per epoch as a function of packet length for packets segmented to 1000 bytes or less in size.

The comparative performance of these two systems is further illustrated in FIGS. 2 and 3, which plot bytes transmitted/epoch against packet length in bytes, assuming all packets have a fixed length and the epoch size is 10,000 bytes. FIG. 2 shows the performance for epochs that only contain whole packets. The performance follows a zigzag pattern, decreasing to a low that equates to 50% bandwidth efficiency for packets 5001 bytes in length.

By segmenting large packets into smaller segments, the efficiency is increased for larger packet sizes. And by choosing a segment size that is not too small, the efficiency for small packets is not significantly affected. The efficiency of a given packet/segment maximum size is approximately given by the formula:

$$\text{efficiency} = \text{packet\_bytes} * \text{floor}(\text{epoch\_bytes}/\text{packet\_bytes})/\text{epoch\_bytes}$$

This formula does not account for additional headers used for each segment.

In a world where the traffic length cannot be controlled, what matters is the length of the next packet that would be transmitted as compared to the length of time remaining in the epoch. FIG. 2 gives some expectation that lost bandwidth could be significant when large packets appear frequently in the traffic mix.

FIG. 3 shows a similar graph, but in a system where all packets larger than 1000 bytes are segmented into multiple segments, each no larger than 1000 bytes. On the average, even when the last packet added to an epoch is always larger than 1000 bytes, 95% bandwidth utilization is achieved, and worst case bandwidth utilization is 90%.

In addition to increasing average switch fabric throughput, segmentation as described below can decrease latency at several points in the device, and significantly reduce buffer size. These potential advantages will become apparent as the following device components are described.

Figure 4:
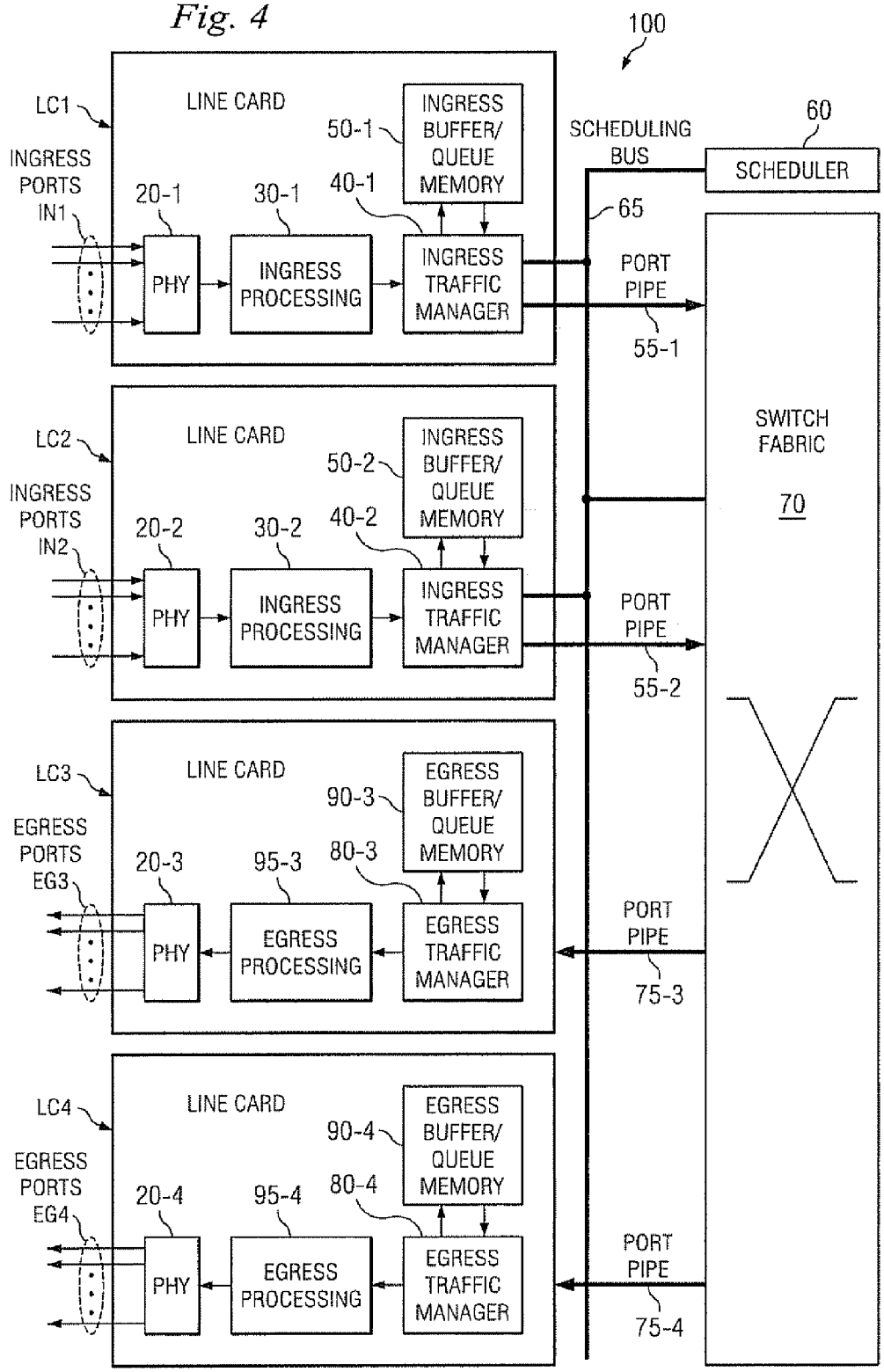
FIG. 4 shows a block diagram of a switch configuration useful with packet-segmenting embodiments.

FIG. 4 shows an exemplary network processing device 100 comprising four line cards LC1 to LC4, a scheduler 60, a switch fabric 70, and several buses implemented on a backplane that connects the line cards, scheduler, and switch fabric. Although each line card is shown as either processing ingress traffic or egress traffic for simplicity, it is understood that most line cards process both ingress and egress traffic. Also, the number of line cards is merely exemplary, as network processing device can contain more or less line cards.

Line card LC1 contains a PHY 20-1, ingress processing 30-1, an ingress traffic manager 40-1, and an ingress buffer/queue memory 50-1. PHY 20-1 receives optical and/or electrical packet data streams on one or more ingress ports In1, and converts these to an electrical format amenable to ingress processing 30-1. Ingress processing classifies the incoming packets, potentially modifies the headers of the packets, and inserts a backplane header on each packet to describe, among other things, each packet's destination line card. The classified, encapsulated packets are then passed to ingress traffic manager 40-1, which decides whether each packet should be dropped due to packet abnormalities (bad CRC, etc.), traffic considerations, etc. Assuming the packet will not be dropped, it is stored in a queue in ingress buffer/queue memory 50-1. The queue is selected according to the packet's priority and its destination line card.

Ingress traffic manager 40-1 reports its queue status to scheduler 60 across a scheduling bus 65. Scheduler 60 runs a scheduling algorithm to determine which switch fabric ingress port pipes (e.g., 55-1 and 55-2) will connect to which switch fabric egress port pipes (e.g., 75-3 and 75-4) during each epoch. The switch fabric configuration for each epoch is transmitted to each line card and switch fabric 70 some time prior to the beginning of that epoch. Ingress traffic manager 40-1 prepares an epoch's worth of packet data for each epoch from one or more of the priority queues associated with the scheduler's designated port pipe pairing. When the epoch begins, the packet data is transferred through port pipe 55-1 to switch fabric 70, where the packet data is switched to an egress port pipe (e.g., port pipe 75-3 to line card LC3).

Line card LC3 contains a PHY 20-3, egress processing 95-3, an egress traffic manager 80-3, and an egress buffer/queue memory 90-3. Egress traffic manager 80-3 receives the packet data from port pipe 75-3 and stores the packet data in egress buffer/queue memory 90-3 (the packet may be dropped at this point based on egress traffic considerations, backplane errors, etc.) Egress traffic manager 80-3 supplies the received packets to egress processing 95-3 for any final packet classification/modification prior to transmission to PHY 20-3. PHY 20-3 converts the packet data to the appropriate optical or electrical format for the designated egress port Eg3 and transmits the packet data.

Line card LC2 contains a PHY 20-2, ingress processing 30-2, an ingress traffic manager 40-2, and an ingress buffer/queue memory 50-2, each functioning similar to the similar units in LC1 (although the PHY can be configured for different signal formats for each card). Similarly, line card LC4 contains a PHY 20-4, egress processing 95-4, an egress traffic manager 80-4, and an egress buffer/queue memory 90-4 each functioning similar to the similar units in LC3.

Figure 5:
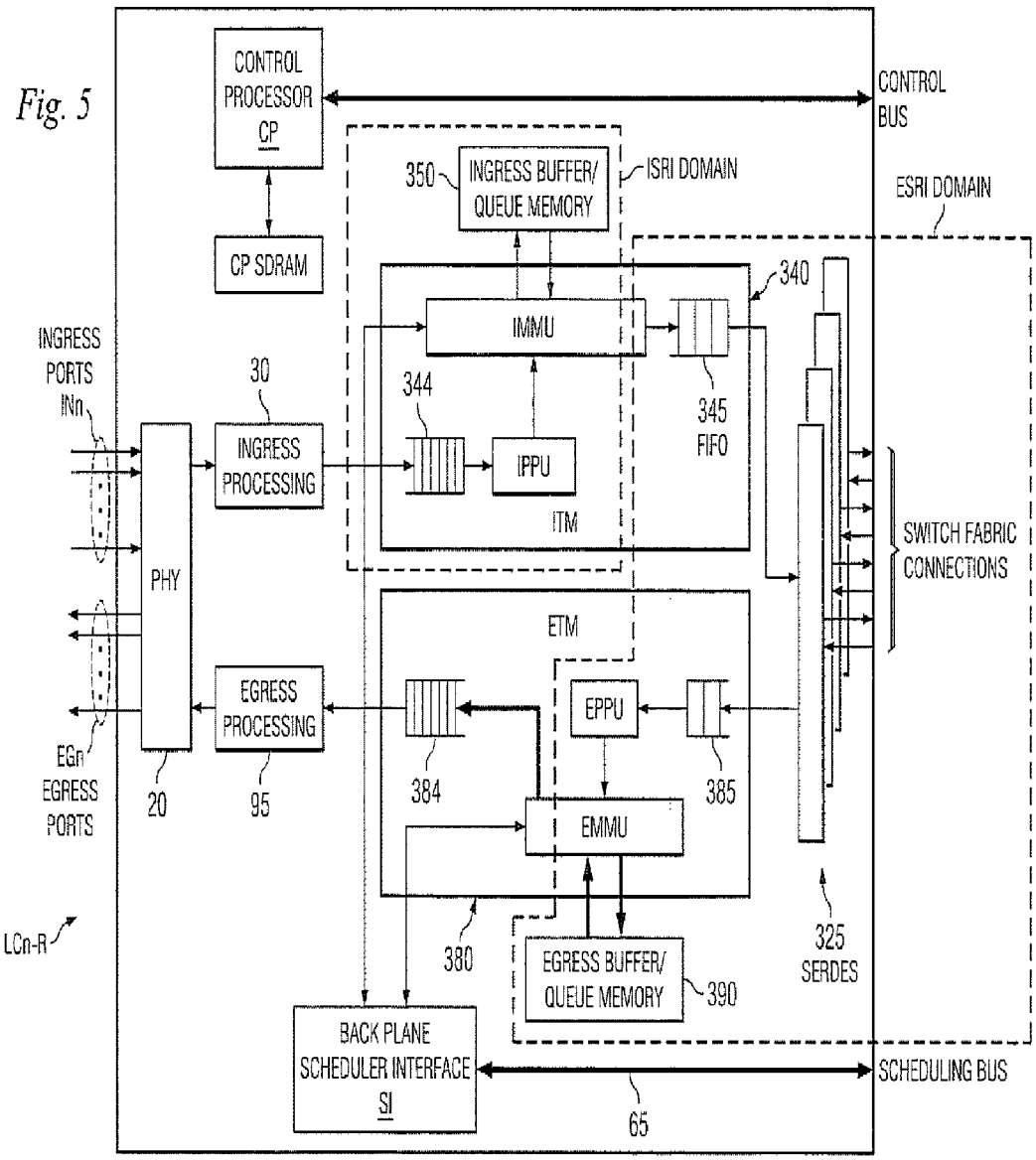
FIG. 5 illustrates details of a line card useful in the switch configuration of FIG. 4.

FIG. 5 contains a more detailed block diagram of a line card LCn-R that combines the functions of the ingress and egress line cards shown in FIG. 4. In addition to the previously described line card blocks, a control processor CP, associated CP SDRAM (synchronous dynamic random access memory), serializer/deserializers (serdes) 325, and a backplane scheduler interface SI are shown. The control processor and associated SDRAM are used to configure the card from a central route processing module (not shown) and convey information to the route processing module across a control bus. The backplane scheduler interface SI serves as an intermediary for scheduling communications with the FIG. 4 scheduler. Likewise, the serdes group 325 communicates across the backplane with the switch fabric as an intermediary between the ITM and ETM and the switch fabric.

Several internal features of ITM 340 and ETM 380 are illustrated. ITM 340 contains an input first-in first-out (IFIFO) 344 to receive packet data from ingress processing 30, an ingress packet processing unit (IPPU) to take packet data from IFIFO 344 and process the data, an output FIFO 345 to send epoch data to serdes group 325, and an ingress memory management unit (IMMU) to coordinate transfer of packet data between the IPPU, OFIFO 345, and ingress buffer/queue memory 350. ETM 380 contains an IFIFO 385 to receive packet data from serdes group 325, an egress PPU to take packet data from IFIFO 385 and process the data, an OFIFO 384 to send packet data to egress processing 95, and an egress MMU to coordinate transfer of packet data between the EPPU, OFIFO 384, and egress buffer/queue memory 390. The operation of these traffic manager components will now be described in further detail.

Figures 6, 7:
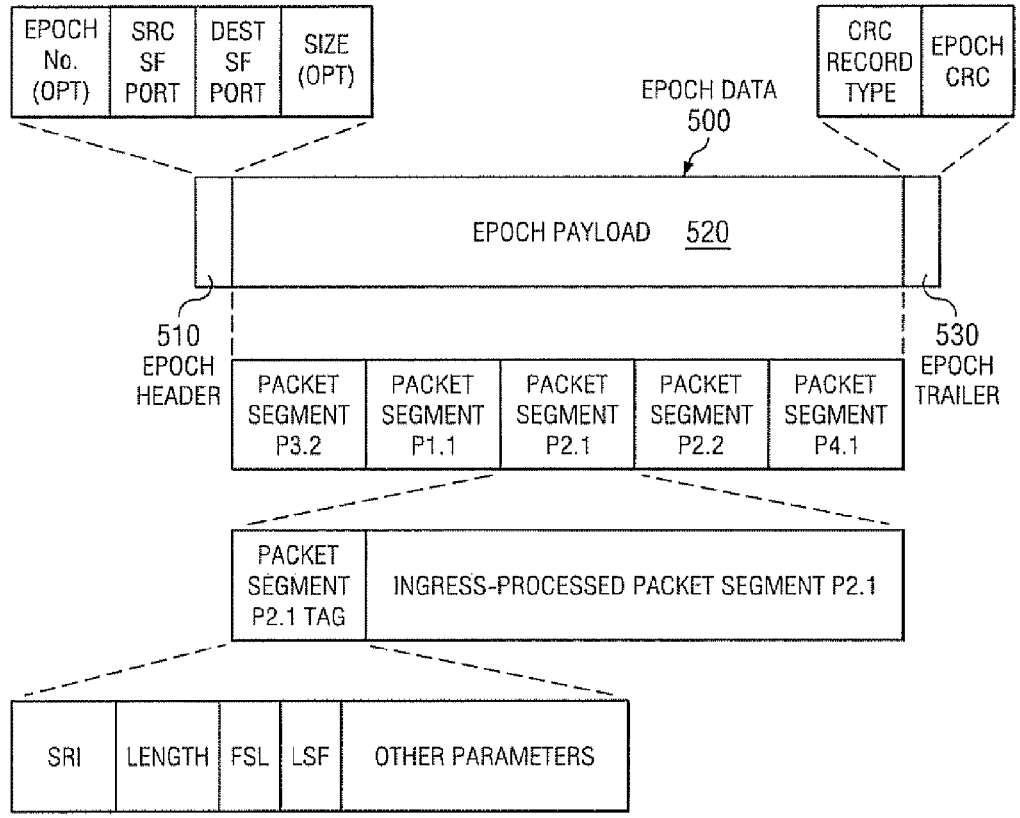
FIG. 6 shows a data format for data transmitted over an epoch.
FIG. 7 depicts how packets of various sizes are internally segmented according to one embodiment.

FIG. 6 contains information on the format of data carried in an epoch from an ingress port pipe to an egress port pipe. Each epoch payload 520 contains an epoch header 510, epoch data 500, and an epoch trailer 530. The epoch header describes the source switch fabric source port ID, switch fabric destination port ID, and optionally the epoch data size and an epoch number. In one embodiment, the IMMU writes the epoch header to OFIFO 345 as each new epoch payload is created. The epoch trailer can comprise, for example, a CRC record type and epoch CRC created by FIFO 345 or the IMMU—the switch fabric and receiving egress line card can use this trailer to detect backplane errors in the epoch payload.

Epoch data 500 contains the packet segments, aligned on four-byte boundaries, that were selected by the IMMU for transmission during the epoch. In this embodiment, these segments are constrained in that all segments for a particular packet will be transmitted in front-to-back order, and one packet will be completed. If a packet has one or more but not all of its segments transmitted during an epoch, the next epoch transmitted from the same SF SPID to the same SF DPID will begin with the remaining segments of the partially-transmitted packet.

Examining packet segment P2.1 as exemplary, it contains a packet segment tag and an ingress-processed packet segment. The packet segment is a portion of the packet as received from ingress processing 30. The packet segment tag is a copy of the backplane header for the packet, with some fields that are specific to the segment. The parameters used by segmentation functions include a source reassembly index (SRI), length field, first segment flag (FSF), and last segment flag (LSF). The SRI changes depending on where the segment is in the device, as will be described below, but in an epoch payload it is the same as the SPID contained in the epoch header. The length, FSF, and LSF parameters will be illustrated further in conjunction with FIG. 7.

FIG. 7 illustrates length, FSF, and LSF values for four different initial packet lengths represented for packets P1 to P4. The example assumes a segment size (SS) of 480 and a maximum segment size (MSS) of 528. The segment size is the "standard" length of all segments except the last segment of a packet. The MSS is a slightly longer size that is allowed for the last segment under certain conditions, as will be illustrated.

First, packet P1 has a packet size of 256, less than the SS. Only one segment P1.1 is created, with a length field of 272—with 16 bytes added to the packet size of 256 to account for the segment header. The segment can be detected as a one-segment packet because both the FSF and the LSF are set to indicate this is both the first and the last segment for the packet.

Packet P2 has a packet size of 800, more than the SS but less than twice the SS. It is segmented into two segments P2.1 and P2.2. The first segment P2.1 has a length of 480 (464 bytes of packet data and 16 bytes of segment header), but in each first segment that is not a last segment the length stored in the header field is the actual length of the entire packet—in this case a length of 816 to account for the packet size plus 16 bytes for the additional backplane header. FSF is set and LSF is unset to indicate this is a first packet segment. The length field meaning therefore varies with the FSF/LSF setting, avoiding the allocation of a separate segment header field for packet length and saving overhead. The entire length is transmitted in the first segment, which also allows for scheduling decisions for an entire packet to be made from the data included in the first segment. Segment P2.2 transmits its true length, 336 bytes of packet data plus 16 bytes of segment header, with FSF unset and LSF set to indicate this is a last packet segment.

Packet P3 has a packet size of 976 bytes, more than twice the SS but less than SS+MSS. In this case, the flags are set similar to P2, but a total length of 992 is contained in P3.1 and a total length of 528 is contained in P3.2. Note that when the last segment is more than SS but less than MSS, it is allowed to exceed SS slightly. This avoids the creation of extremely small segments that might disturb pipeline operation because two segments appear in rapid order in the packet stream.

Packet P4 has a packet size of 1200, more than SS+MSS but less than three times SS. In this case, P4.1 has a length field of 1216 (1200 bytes plus a backplane header), P4.2 has its actual length (480 bytes), and P4.3 has its actual length (288 bytes). P4.2 has neither FSF or LSF set, indicating that it is a middle packet. Longer packets follow the same format as shown for P4, with additional "middle" segments.

Figure 8:
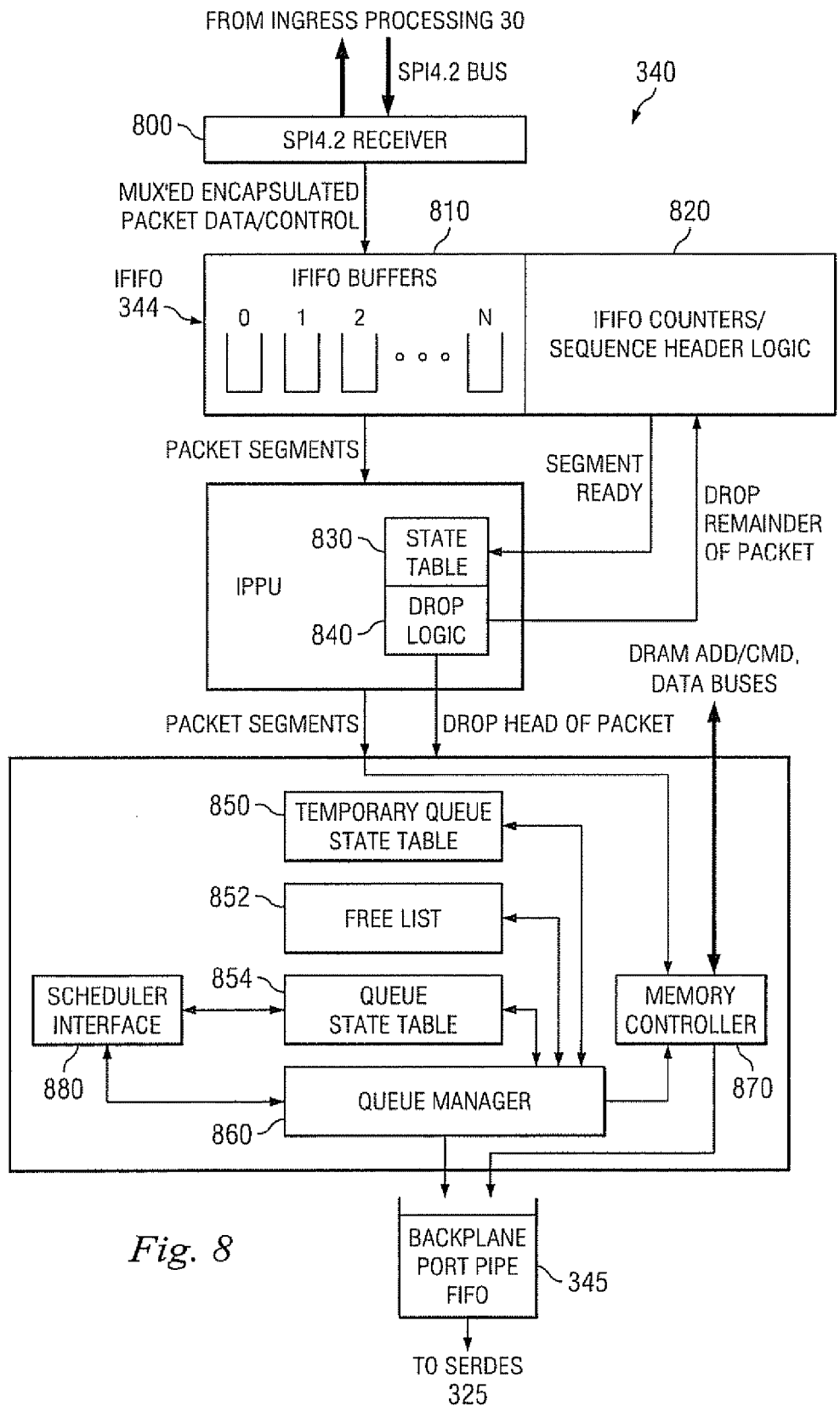
FIG. 8 contains a block diagram for a traffic manager capable of operating according to an embodiment.

FIG. 8 shows additional detail of ITM 340. Ingress processing 30 communicates with an SPI4.2 receiver 800 over an SPI4.2 bus, receiving multiplexed packet bytes for N+1 queues (one for each ingress port plus others for special packets created by the line card). Groups of bytes for different packets are separated by control words that indicate the queue, start of packet (SOP) when a new packet is begun, end of packet (EOP) when a current packet is finished, and other information.

IFIFO 344 comprises a set of IFIFO buffers 810 (numbered 0 to N) and IFIFO counters/sequence header logic 820. The logic accumulates bytes in each buffer until a complete segment is received, either because SS bytes reside in the buffer or because an EOP signal is received for that buffer. Note that in the first case the IFIFO counter is allowed to reach MSS before an SS-byte segment is created, in order to allow last-segment lengths up to MSS. When a segment is created, the backplane header fields are filled in with the actual segment size, FSF, and LSF values, and the IPPU is notified that a segment is ready. If the segment is not the last segment, a copy of the backplane header is inserted in the IFIFO buffer after the current segment to become the backplane header for the next segment. Once all segments are sent for a packet, the counters and state for that IFIFO buffer are reset in preparation for the next packet.

By moving part of the IFIFO function (the gathering of whole packets) into the large external buffer memory 350, the sizes of the on-chip FIFO memory can be reduced significantly.

Without segmentation in the FIFO, the size of the IFIFO is approximately:

$$size1 = number\_of\_ports * max\_packet\_size * F, \text{ where } F$$
is a number>1, usually from 1 to 2.

With segmentation in the FIFO, the size of the IFIFO is approximately:

$$size2 = number\_of\_ports * max\_segment\_size * F$$

Therefore, if jumbo packets are to be supported by a system, the savings in the on-chip FIFO memories with the invention can be very significant.

For example, if:
number_of_ports=48,
max_packet_size=9600 bytes,
max_segment_size=528, and
F=2, then:

$$size1 = 48*9600*2 = 921.6 \text{ k bytes}$$

$$size2 = 48*528*2 = 50.7 \text{ k bytes}$$

The ratio of non-segmented IFIFO size to segmented IFIFO size is more than 18 to 1.

By allowing the segments to be sent by the IFIFO before the entire packet is received by the buffering unit, the latency of individual packets can be reduced. Cut-through can be safely done on the ingress buffering unit; cut-through on the egress buffering unit has the danger of under-run on the egress port. If an error is detected in a later segment and the earlier segments have already been sent on the backplane, then an error segment must be stored in the ingress buffer and then sent to the egress buffer to cause the packet in the temporary queue to be discarded.

After segmenting a packet, the segments from one source can be intermixed with segments from another source in the buffer/queue memories. However, from any given source, the segments are linked in order.

The units in the processing pipeline generally need to operate on whole packets. Therefore, a source_index is generated and placed into the segment header to identify the source port that generated the packet. Each source must have a unique value for source_index. The source_index is analogous to the process-id in a multi-tasking operating system. Each processing unit in the pipeline maintains the state that is required from segment to segment in a state table that is indexed by the source_index. Therefore, each source port has a separate context, which is switched for each segment received by the unit based on the source_index.

A simple example is the calculation of CRC (Cyclic Redundancy Check) per packet to determine if the packet is error-free. The CRC code is appended at the end of each packet. When the first segment is received, the CRC function is initialized as follows:

state_table.crc_state[src_index]=crc32(0xffffffff,seg-
        ment_data);

For the second and later segments, the computation is this:

state_table.crc_state[src_index]=crc32(state_table.crc_state[src_index],segment_data);

Other examples of the information that is kept in the state table are the computed packet length and the packet drop decision (when the decision to drop can be made at the first segment).

For the ingress path, the source_index used is called the ISRI. This index is used throughout the ISRI domain comprising the IFIFO, IPPU, and IMMU write function. The index is generated and inserted into the segment header by the IFIFO, and is the source port number. For packets that are internally generated, such as mirroring and control packets, other unique index values are used that do not conflict with the values used by the source ports.

For the egress path, the source_index used is called the ESRI. This index is used throughout the ESRI domain comprising the IMMU read function, port pipe FIFOs and switch fabric, and EMMU write function). The index that is generated and inserted into the segment header by the read function of the IMMU is the source switch fabric port number. Note that the ESRI source index can be generated either prior to storing a segment in buffer/queue memory 350, or after the segment is read by the IMMU from the buffer/queue memory.

The source_index that is used in the ESRI domain is the concatenation of the ESRI from the segment header with the class-id (service class) of the packet. The reason for concatenating the class-id is that the backplane scheduler is allowed to stop in the middle of a packet for one class-id and then schedule from another class-id on the next grant.

If the backplane scheduler is able to complete a packet from one class-id before changing to another, then the ESRI alone can be used as the source_index.

After the packet has been segmented, the segments pass through the IPPU, where various error/traffic shaping functions are performed. A state table 830 in the IPPU tracks each packet, since the IPPU drop logic 840 switches contexts as it switches between the IFIFO buffers. Should a decision to drop a packet be made before the entire packet is received through IFIFO 344, the IPPU signals the IFIFO to drop the remainder of the packet instead of segmenting it. It also signals the IMMU to drop any head of the packet segments that have already been stored to external memory. Some of the errors that can be checked are: missing first segment, missing last segment, size error (the sum of the size of the segments does not match the total packet size), and CRC error. Packets can be dropped from the temporary queues due to other reasons, such as QOS congestion (WRED) or packet larger than the MTU. When a packet is dropped from a temporary queue, the memory consumed by the packet is returned to the free buffer pool and the reason for the drop is recorded in status and error counters.

The packet segments leaving the IPPU are written by the IMMU to a set of queues that are organized based on the destination port. This same action occurs both in the ingress and egress buffering units. The segments for a given source_index are accumulated in a set of temporary queues, indexed by the source_index. A temporary queue state table 850 stores a linked list of segment descriptors that describe the entire packet as contained in memory. New memory segments are received from free list 852 and returned to the free list when the packet is sent. When all the segments in a complete packet are received from a given source_index, and there are no errors detected or drop required, then the packet is transferred from the temporary queue to the permanent queues in queue state table 854. This provides the main part of the re-assembly function.

Queue manager 860 manages these functions, including changing the source index, and inserting the total packet length in the first segment once all segments are received. It also communicates with a scheduler interface 880 to accomplish scheduling functions, and with a memory controller 870 that performs the actual reads and writes to the external memory.

In addition, a time-out function is supported to re-claim the memory consumed by the temporary queues. When errors occur on the backplane, the last segment of a packet may be lost. The time-out is per source_index, and returns the memory consumed by the packet to the free buffer pool if the interval between receiving segments from a given source_index exceeds the programmed time-out interval. This allows the recovery of buffer memory when a port is disabled, for example.

When either the backplane scheduler (ingress) or the egress scheduler makes a read request, then packets are read from the requested queue. The request indicates the destination port, which may trigger reading multiple queues based on the class-ids that have packets stored in the buffer. Once a segment is read, the memory used to hold the segment is returned to the free buffer pool.

The egress traffic manager functions in similar fashion to the ingress traffic manager.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures. It should be noted that the names given to modules and components of the system in the detailed description and claims are merely used to identified the modules and components for the sake of clarity and brevity and should not be used to limit or define the functionality or capability thereof unless explicitly described herein.

What is claimed is:

1. A method of processing network packets, the method comprising:
    receiving a packet on a port of a network switching device;
    segmenting the packet into one or more first segments each having a first segment size and a second segment having a second segment size at least when a length of the packet is greater than the second segment size, wherein the segmenting operation allows the second segment size to exceed the first segment size by up to an overflow amount when doing so will allow the second segment to be a last segment in the packet;
    outputting the first segment to a switch fabric during a first epoch; and
    outputting the second segment to the switch fabric during a second epoch different from the first epoch.

2. The method of claim 1, further comprising delaying outputting of the second segment to the switch fabric until it is determined whether the second segment can be made the last segment of a size exceeding the first segment size by up to the overflow amount.

3. The method of claim 1 wherein each segment of the first and second segments is accompanied by a length parameter indicating:
- the segment's length if the segment is not at a start of the packet;
- the packet's size if the segment is at the start of the packet.

4. A method of processing network packets, the method comprising:
- receiving packets on at least some of ports of a network processing device;
- processing the packets; and
- transmitting at least some of the packets on at least some of the ports of the network processing device;
- wherein processing the packets comprises, for at least some packets that are to be transmitted, transferring the packets through a switch fabric of the network processing device to deliver the packets to one or more ports on which the packets are to be transmitted;
- wherein the switch fabric operates in epochs, each epoch corresponding to an interconnection between the switch fabric's inputs and the switch fabric's outputs;
- wherein processing the packets comprises, for at least some packets transferred through the switch fabric, segmenting at least those packets that exceed a predefined maximum segment size into one or more segments, wherein each segment that is not the last segment is at most a predefined first segment size smaller than the maximum segment size, but the last segment of at least one packet is of a size exceeding the first segment size but not the maximum segment size;
- wherein the switch fabric is operable to receive segments of different packets for each epoch;
- wherein for at least one segmented packet, each segment is provided to the switch fabric in a single epoch, but at least two segments of the packet are provided to the switch fabric in respective different epochs.

5. The method of claim 4 wherein each segment of a segmented packet is created by buffering the packet's data for the segment and tracking a length of data being buffered to determine if the segment being created can be made the last segment of the packet, the length of data being buffered being allowed to reach the maximum segment size, but if the length of data being buffered exceeds the first segment size and the segment cannot be made the last segment of the packet then the segment is defined to have the first segment size.

6. The method of claim 4 wherein each segment of each segmented packet provided to the switch fabric is accompanied by a length parameter indicating:
- the segment's length if the segment is not the first segment of the packet;
- the packet's size if the segment is the first segment of the packet.

7. The method of claim 6 wherein each segment that is not the last segment has the first segment size.

8. The method of claim 6 wherein the length parameter is part of a segment header provided to the switch fabric with the segment, and the length parameter is augmented by a length of the header.

9. A network processing device comprising:
- a plurality of ports for receiving and transmitting packets; and
- a processing module for processing of packets received on the ports;
- wherein the processing module comprises a switch fabric for transferring the packets to one or more ports on which the packets are to be transmitted;
- wherein the processing module is configured to operate the switch fabric in epochs, wherein for each epoch the processing module is to interconnect the switch fabric's inputs and outputs in a configuration corresponding to the epoch, and the processing module comprises a scheduler for determining the configuration for each epoch;
- wherein the processing module comprises segmenting logic for segmenting a packet to be transferred by the switch fabric into a plurality of segments if the packet exceeds a predefined maximum segment size, each segment other than the last segment being at most a predefined first segment size smaller than the maximum segment size, the last segment being allowed to exceed the first segment size but not the maximum segment size;
- wherein the processing module comprises a manager for selecting packets or packet segments for providing to the switch fabric for each epoch, the switch fabric being operable to receive segments of different packets for each epoch, and to receive different segments of a packet in respective different epochs.

10. The network processing device of claim 9 wherein the segmenting logic is configured to create segments of a packet by buffering the packet's data for the segment and tracking a length of data being buffered to determine if the segment being created can be made the last segment of the packet, the length of data being buffered being allowed to reach the maximum segment size, but if the length of data being buffered exceeds the first segment size and the segment cannot be made the last segment of the packet then the segment is defined to have the first segment size.

11. The network processing device of claim 9 wherein the processing module comprises a plurality of line cards each of which comprises one or more of the ports on which packets can be received, and the manager comprises a separate manager in each line card for selecting packets or packet segments received at the line card for transfer by the switch fabric.

12. The network processing device of claim 9 wherein the manager is configured to provide, to the switch fabric, each segment with a length parameter indicating:
- the segment's length if the segment is not the first segment of the packet;
- the packet's size if the segment is the first segment of the packet.

13. The network processing device of claim 12 wherein each segment that is not the last segment has the first segment size.

14. The network processing device of claim 12 wherein the length parameter is part of a segment header to be provided to the switch fabric with the segment, and the length parameter is augmented by a length of the header.

15. A line card for use in a network processing device, the line card comprising:
- a plurality of ports;
- a PHY device for receiving packets on one or more of the ports;
- an ingress traffic manager for obtaining at least some of the packets received by the PHY device and segmenting at least some of the packets that exceed a predefined maximum segment size into multiple segments such that each segment that is not the last segment of a packet has a predefined first segment size smaller than the maximum segment size;
- an interface for connection to a switch fabric configured for transferring at least packets segmented by the ingress traffic manager to one or more ports of the network processing device on which the packets are to be transmitted by the network processing device;

wherein for each epoch for which the switch fabric's inputs and outputs are interconnected in a configuration corresponding to the epoch, the ingress traffic manager is operable to provide to the switch fabric, for the epoch, a plurality of segments of different packets for transfer by the switch fabric if the ingress traffic manager has obtained such segments.

16. The line card of claim 15 wherein the ingress traffic manager is configured to create segments of a packet by buffering the packet's data for the segment and tracking a length of data being buffered to determine if the segment being created can be made the last segment of the packet, the length of data being buffered being allowed to reach the maximum segment size, but if the length of data being buffered exceeds the first segment size and the segment cannot be made the last segment of the packet then the segment is defined to have the first segment size.

17. The line card of claim 15 wherein the ingress traffic manager is to provide, to the switch fabric, each segment with a length parameter indicating:

the segment's length if the segment is not the first segment of the packet;

the packet's size if the segment is the first segment of the packet.

18. The line card of claim 17 wherein each segment that is not the last segment has the first segment size.

19. The line card of claim 17 wherein the length parameter is part of a segment header to be provided to the switch fabric with the segment, and the length parameter is augmented by a length of the header.

* * * * *